No. 827,092. PATENTED JULY 31, 1906.
J. T. FREESTONE.
SANITARY DISINFECTING AND DEODORIZING BLOCK.
APPLICATION FILED SEPT. 8, 1905.
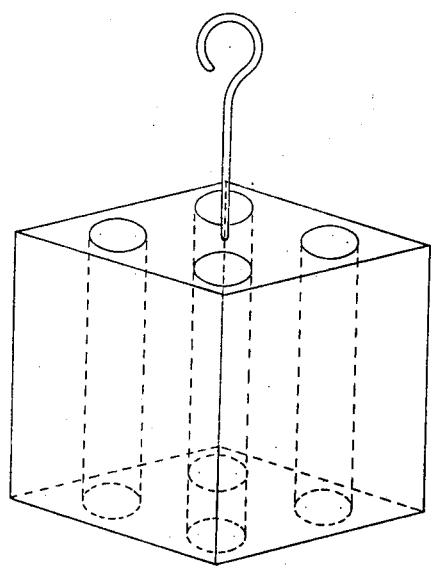
WITNESSES:
John A. Percival.
Edw. J. McNamara
INVENTOR.
JOSEPH T. FREESTONE
ATTORNEYS.

UNITED STATES PATENT OFFICE.

JOSEPH THOMAS FREESTONE, OF ROCK FERRY, ENGLAND.

SANITARY DISINFECTING AND DEODORIZING BLOCK.

No. 827,092.      Specification of Letters Patent.      Patented July 31, 1906.

Application filed September 8, 1905. Serial No. 277,517.

*To all whom it may concern:*

Be it known that I, JOSEPH THOMAS FREESTONE, a subject of the King of England, residing at Rock Ferry, in the county of Chester, England, have invented new and useful Improved Sanitary Disinfecting and Deodorizing Blocks, of which the following is a specification.

This invention refers to the manufacture of disinfecting and deodorizing or sanitary blocks used in spaces, sewage-gulleys, traps, cisterns, and the like, the base disinfecting or deodorizing substance being naphthalene, which is a well-known deodorizing and disinfecting substance.

This invention consists of the manufacture of such blocks, preferably perforated blocks, which will dissolve or vaporize away uniformly—that is, at a uniform rate throughout their bodies from the time they are first put in use till the end—and so obviate the defects in this respect which exist in deodorizing and disinfecting blocks hitherto made in which naphthalene has been employed as a chief deodorizing and disinfecting medium and which also will be stronger and more durable.

The blocks of perforated form, a perspective view of which is shown in the drawing hereto annexed, are made up in soluble form for use in connection with liquids by which they will be dissolved, such as water and sewage liquids.

The soluble blocks for use for disinfecting and deodorizing water or sewage fluids are comprised of the following ingredients in the proportions stated—namely, hard-pressed and highly-refined naphthalene, thirty parts; resin, twenty-five parts; pine-oil, twelve parts; caustic soda or alkali, thirteen parts, and water fifteen parts. This specific form of naphthalene referred to—namely, hard-pressed highly-refined naphthalene—is found to produce a superior block to that produced from naphthalene in granular form and is harder and stands more rough handling or knocking about, and the specific proportions of ingredients referred to produce a block which not only is harder and resistant to rough handling, but will dissolve uniformly—that is, at a uniform rate from the commencement of use to the end—and will not disintegrate toward the end of its existence into little pieces.

The ingredients are combined together and compressed into perforated blocks of the form shown, and these blocks may be supported, suspended, or used in any suitable known way, the perforations of the blocks being provided to equally distribute the surface in the block acted upon by the liquid as far as possible and increase the surface which is to be acted upon by it.

What is claimed is—

A sanitary block soluble in water or fluids containing water, consisting of naphthalene, hard pressed and highly refined, thirty parts; resin, twenty-five parts; pine-oil, twelve parts; alkali, thirteen parts; and water, fifteen parts; substantially as set forth.

In testimony whereof I have signed my name to this specification in the presence of two subscribing witnesses.

JOSEPH THOMAS FREESTONE.

Witnesses:
     S. GOODALL,
     W. HARRISON.